United States Patent [19]

Allen

[11] Patent Number: 4,632,044

[45] Date of Patent: Dec. 30, 1986

[54] MOBILE FERTILIZER DISTRIBUTOR

[76] Inventor: Sebree J. Allen, Rte. 2, Kevil, Ky. 42053

[21] Appl. No.: 691,429

[22] Filed: Jan. 14, 1985

[51] Int. Cl.[4] .............................................. A01C 23/02
[52] U.S. Cl. ........................................................ 111/7
[58] Field of Search ................... 111/6, 7, 1; 123/568; 172/609; 60/281

[56] References Cited

U.S. PATENT DOCUMENTS

| | | | |
|---|---|---|---|
| 1,002,344 | 9/1911 | Watson | 111/7 |
| 1,717,911 | 6/1929 | Brewer | 111/7 |
| 1,725,190 | 8/1929 | Hicks | 172/59 X |
| 2,584,674 | 2/1952 | Costa | 60/278 |
| 3,099,898 | 8/1963 | Harris | 111/7 X |
| 3,924,897 | 12/1975 | Colburn et al. | 111/6 X |
| 4,065,919 | 1/1978 | Eknayan | 123/568 X |
| 4,223,650 | 9/1980 | Herbert | 123/568 |
| 4,253,273 | 3/1981 | Rees et al. | 47/58 |

FOREIGN PATENT DOCUMENTS

| | | | |
|---|---|---|---|
| 1272868 | 11/1960 | France | 111/7 |
| 713712 | 2/1980 | U.S.S.R. | 111/7 |

*Primary Examiner*—Robert A. Hafer
*Assistant Examiner*—Danton DeMille
*Attorney, Agent, or Firm*—Harrington A. Lackey

[57] ABSTRACT

A mobile fertilizer distributor apparatus and method including the collection of gasoline products of combustion from the internal engine of a prime mover and air from the ambient atmosphere to form a hot gaseous mixture, compressing the hot gaseous mixture and continuously introducing the compressed hot gaseous mixture into the soil over which the prime mover is moving. The hot gaseous mixture, after it is compressed, may be mixed with a supplemental nutrient prior to introduction into the soil.

9 Claims, 3 Drawing Figures

MOBILE FERTILIZER DISTRIBUTOR

BACKGROUND OF THE INVENTION

This invention relates to a method and apparatus for continuously fertilizing the soil, and more particularly to a method and apparatus for distributing the products of combustion of an internal combustion engine into the soil as nutrients.

The fertilization of plants and crops by the introduction of inorganic and organic chemicals into the soil to provide nutrients for the plants, is well known. Such chemicals are introduced to the soil by various mobile delivery apparatus, such as by spraying.

The U.S. Pat. No. 1,038,084 (Carroll) discloses a mobile fertilizer distributor apparatus carrying a fertilizer solution tank and an air tank, and a subterranean distributor device for discharging a mixture of the fertilizer solution and compressed air beneath the soil continuously along the path of the mobile apparatus.

The following U.S. patents disclose various types of subterranean delivery systems for fertilizers, including cultivator tines or plow shares:

U.S. Pat. No. 1,739,765, McEwen, Dec. 17, 1929;
U.S. Pat. No. 2,988,026, Heckathorn, Jun. 13, 1961;
U.S. Pat. No. 3,439,636, Lemke, Apr. 22, 1969;
U.S. Pat. No. 4,231,306, Whitehead et al, Nov. 4, 1980.

The U.S. Pat. No. 1,667,923 (Bishop) discloses a mobile apparatus for injecting a mixture of fertilizer solution and compressed air into the soil with a soil penetrating blade.

The following U.S. patents disclose a mobile apparatus for delivering fertilizer to the soil, in which the apparatus is powered by an internal combustion engine and the principal nutrients supplied to the soil are derived from the products of combustion from the exhaust of the internal combustion engine:

U.S. Pat. No. 1,725,190, Hicks, Aug. 20, 1929;
U.S. Pat. No. 2,943,419, Harris, Jr., Jul. 5, 1960;
U.S. Pat. No. 3,099,898, Harris, Jr., Aug. 6, 1963.

Both Harris patents disclose a subterranean nozzle for delivering the products of combustion below the surface of the soil.

In the Hicks patent and both Harris patents, the products of combustion are carried from the exhaust outlet pipe through a closed circuit system to the nutrient discharge devices. Accordingly, no ambient air is mixed with the products of combustion.

Moreover, the closed circuit systems disclosed in the Hicks and Harris patents tends to produce an unnecessary back pressure on the engines and retains substantial amounts of heat which tend to ruin the engine's valves.

SUMMARY OF THE INVENTION

It is therefore an object of this invention to provide a method and apparatus for collecting both the products of combustion from the exhaust of an internal combustion engine of a prime mover of a fertilizer distributor apparatus and air from the ambient atmosphere, to produce a hot gaseous mixture which is compressed and introduced in its hot compressed condition subterraneously into the soil over which the fertilizer distributor apparatus moves.

The products resulting from the combustion of hydrocarbon fuel includes most of the principal nutrients required by the soil for the production of crops, and specifically nitrogen, carbon, sulfur, in ionic elemental or radical form, and various compounds thereof, such as carbon dioxide, nitrogen hydride and anhydrous ammonia. The ambient air is the primary source of the nitrogen, while the carbon and sulfur are derived from the hot exhaust gasses. Although air, is ingested into the internal combustion engine and reacts with the hydrocarbon fuel in the combustion process to produce many of the nutrient nitrogen compounds and oxidation compounds, nevertheless, substantial quantities of additional nitrogen and oxygen from the ambient air are combined in the collection chamber with the hot gaseous products of combustion, as free ionic elements to improve the activity of the aerobic microorganisms in the soil, or to combine with the hot products of combustion to provide additional compounds of nitrogen and oxygen.

Practically all of the exhaust gasses are collected from the exhaust pipe and mixed with the ambient air, which is approximately 78% nitrogen and 21% oxygen. The hot gaseous mixture of the products of combustion and the air are drawn under slight negative pressure to the compressor to minimize any back pressure upon the gaseous mixture. Excessive negative pressure or vacuum is avoided so that the flow of gasses to the compressor will not be so great as to unduly cool the hot gasses. Compression of the hot gaseous mixture, not only provides a more concentrated mixture of nutrient elements, but also provides a source of auxiliary heat, to assure that the nutrients entering the soil are hot. Maintenance of the heat in the gaseous mixture is important in order to maintain many of the nutrient elements in their ionic form, so that they react more productively with the microorganisms in the soil to produce the nutrients utilized by the plants.

Specifically, the apparatus includes a collection chamber mounted above the exhaust pipe of the internal combustion engine of the prime mover. The chamber has a central opening in its bottom which is in direct vertical registry with, but spaced above, the exhaust pipe outlet, so that most, if not all, of the upward moving hot exhaust gasses enter the opening in the bottom of the collection chamber. This upward exhaust gas movement also draws from the ambient atmosphere substantial quantities of air, which commingles with the gaseous products of combustion within the collection chamber. The hot gaseous mixture is then drawn through a duct rearwardly to a compressor, which in turn, compresses the hot gaseous mixture and feeds such mixture to a conduit which introduces the concentrated hot gaseous mixture subterraneously into the soil over which the prime mover travels. Some type of blade or tine is mounted on the prime mover to precede the discharge conduit to open a furrow in the soil for the subterraneous introduction of the hot gaseous nutrients.

If desired, a container of supplemental nutrient slurry is mounted on the prime mover and is provided with a conduit to introduce the auxiliary slurry into the discharge duct along with the hot gaseous mixture. The slurry may function to absorb the gasses into a total nutrient solution which will be localized within the soil near the point of introduction. This slurry may include supplemental nutrients, such as calcium carbonate. Potassium carbonate or potash could also be used as the supplemental nutrient.

Tractors used in agricultural field work use approximately 80 lbs. of petroleum, or hydrocarbon, fuel per hour, in order to power the tractor over the soil for distributing fertilizer, for example. Fertilizer chemicals, particularly of an inorganic nature, are quite expensive. Furthermore, as the fertilizer is being distributed over the field, the products of combustion of the internal combustion engine of the prime mover or tractor are being discharged as waste gasses and particulates, and more importantly, as pollutants to the atmosphere.

By utilizing the method and apparatus of distributing fertilizer in accordance with this invention, substantially all of the nutrients discharged into the soil are obtained at no additional cost to the cost of the power fuel. The waste products of combustion are captured and utilized, and the air in the atmosphere is abundantly available without additional charge. Moreover, by utilizing substantially all of the waste products of combustion, they are removed from the atmosphere as pollutants.

DESCRIPTION OF THE PREFERRED EMBODIMENTS

Figure 1:
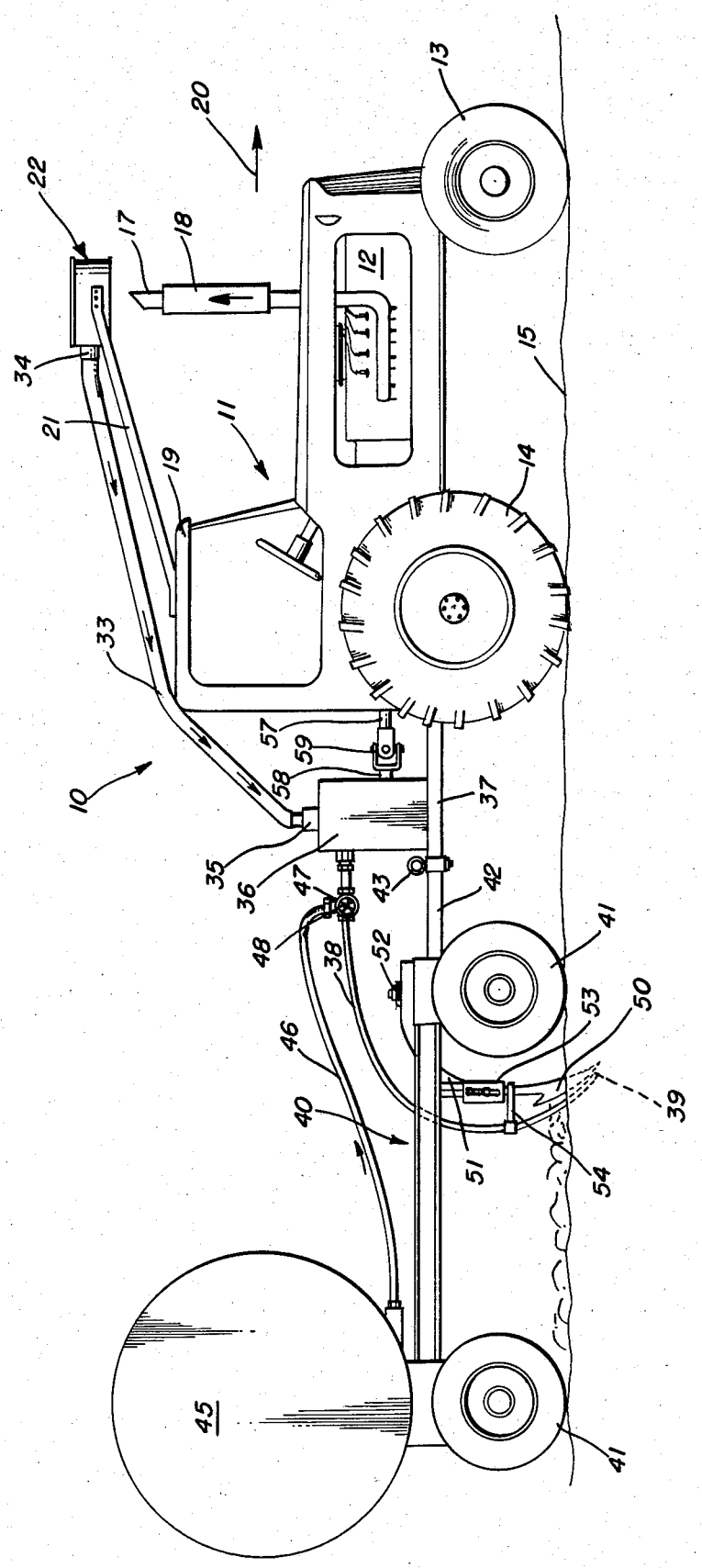
FIG. 1 is a side elevational view of an apparatus made in accordance with this invention operating to introduce nutrients subterraneously into the soil of an agricultural field.

Referring now to the drawings in more detail, FIG. 1 discloses a mobile fertilizer distributor 10 made in accordance with this invention, including a tractor or prime mover 11 having an internal combustion engine 12 and wheels 13 and 14 for self-propelled locomotion over the surface of an agricultural field 15.

The internal combustion engine 12 is provided with a vertical exhaust pipe 17 having a muffler 18. The exhaust pipe 17 normally rises above the top of the tractor cab 19 to discharge the exhaust gasses above the tractor 11. Normally, upon ignition, the internal combustion engine 12 burns liquid hydrocarbon fuel in the form of certain refined petroleum products, such as gasoline or diesel fuel, in combination with controlled amounts of air to power the tractor 11 in the direction of the arrow 20 over the agricultural field 15. The products of combustion pass upwardly through the exhaust pipe 17 and are conventionally discharged to the atmosphere, so that they flow rearwardly over the top of the cab 19, and disappear into the atmosphere.

The parts thus far described are conventional and well known in the operation of tractors used in agricultural field work.

Mounted by a pair of elongated, forward and upward directed support arms 21 is a bonnet or collection housing 22 located directly over, and spaced above, the top open end 23 of the exhaust pipe 17.

Figure 2:
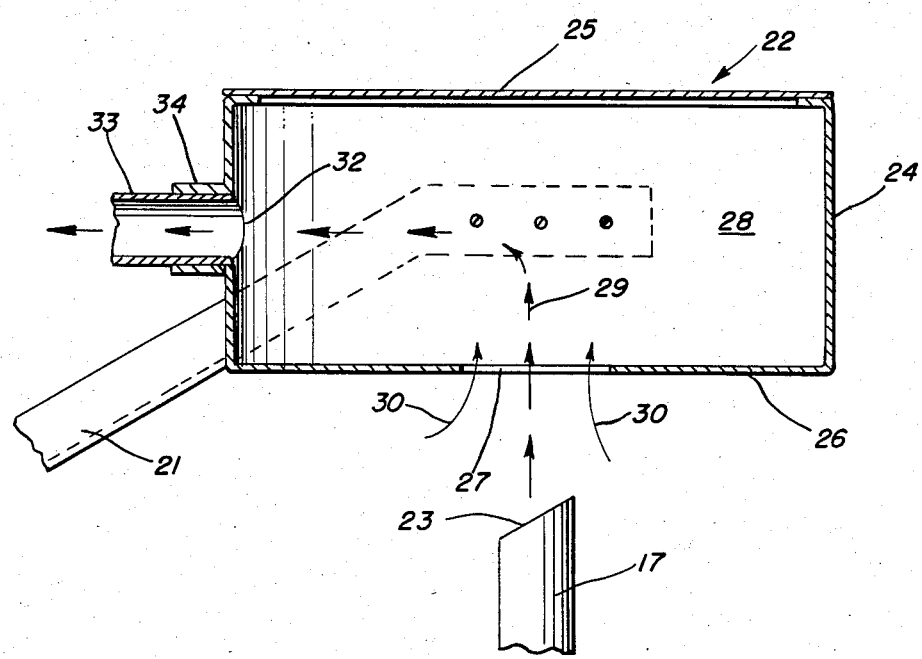
FIG. 2 is an enlarged, fragmentary, longitudinal sectional view of the collector device disclosed in FIG. 1.

In a preferred form of the invention, the collection housing 22 has a cylindrical side wall 24, a flat closed top wall 25, and a flat bottom wall 26 having an inlet opening 27 therethrough in vertical alignment with the outlet 23 of the exhaust pipe 17. The cylindrical side wall 24 and the top and bottom walls 25 and 26 enclose a collection chamber 28 for receiving, not only the vertically directed hot products of combustion as shown by the direction arrows 29, but also air from the ambient atmosphere as illustrated by the solid arrows 30 (FIG. 2).

Formed in the rear end of the cylindrical side wall 24 is a gas outlet opening 32 in fluid communication with a gas duct or conduit 33 extending rearwardly over the top of the tractor cab 19. The front end of the duct 33 may be secured to the collection housing 22 by a fitting 34, while the rear end of the duct 33 may be connected by a fitting 35 to a conventional blowertype gas compressor 36 mounted on the draw bar 37 on the rear of the tractor 11.

Figure 3:
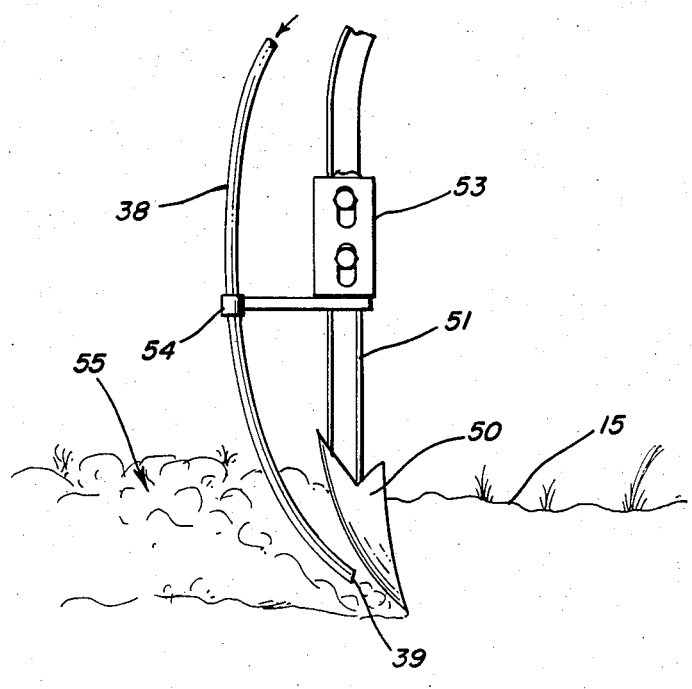
FIG. 3 is an enlarged, fragmentary, side elevational view of the subterraneous nutrient discharge device in operative position.

The discharge outlet of the compressor 36 is connected in fluid communication with a discharge conduit 38 which extends rearwardly and downwardly to have its discharge end 39 disposed beneath the surface of the soil in the field 15, in operative position, as disclosed in FIG. 3.

As an optional feature of the apparatus 10, a trailer vehicle 40 having wheels 41 may be coupled to the draw bar 37 by its tongue 42 and coupling pin 43 to trail the tractor 11 during its movement over the field 15.

Mounted on the trailer vehicle 40 is a container 45 of liquid supplementary nutrient, such as a calcium carbonate slurry. The liquid contents of the container 45 are drawn through a supplementary discharge conduit 46 where the conduit 46 is joined to the discharge conduit 38 by a Tee-connection 47, including a control valve 48, for controlling the amount of fluid which passes through not only the conduit 38, but from the conduit 46 into the conduit 38.

As disclosed in FIG. 1, a plow share 50 is fixed to the lower end of an arcuate support arm 51, the upper end of which may be fixedly attached to the trailer vehicle 40 by mounting means such as bolt 52 (FIG. 1). The arm 51 may be stabilized by the bracket 53 fixed to the frame of the trailer vehicle 40 (FIG. 1). The lower end portion of the discharge conduit 38 may be reinforced or supported by a bracket 54 connected to the support arm 51, if desired. The bracket 54 supports the lower end portion of the discharge conduit 38 immediately behind the plow share 50, as disclosed in FIGS. 1 and 3, so that the plow share 50 digs a furrow 55 in which the nutrients are discharged behind the plow share 50 through the open end 39 of the discharge conduit 38, as the tractor 11 moves forward over the agricultural field 15.

In the event that a trailer 40 and container 45 are not utilized, the plow share arm 51 may be supported upon the rear end of the tractor 11, in any desired manner, and the discharge conduit 38 supported immediately behind the plow share 50.

In the operation of the apparatus 10, the container 45 is filled with the desired amount of supplemental nutrient solution, the trailer vehicle 40 coupled to the draw bar 37, by means of the coupling device 43, and the plow share 50 and discharge conduit 38 positioned to penetrate the soil 15. The operator starts the tractor 11 by igniting the engine 12 and guiding the powered tractor 11 over the field 15 along the desired rows in which it is desired to introduce the nutrients.

As the tractor 11 moves over the field 15, the plow share 50 penetrating the surface of the field 15 digs an elongated furrow 55. The exhaust gases from the exhaust pipe 17 are discharged vertically upward, as illustrated by the lines 29 in FIG. 2, through the inlet opening 27 into the collection chamber 28, as illustrated in FIG. 2. The spacing between the open end 23 of the exhaust pipe 17 and the inlet opening 27 of the collection chamber 28 is preferably at least 6". This spacing permits the ambient air to be drawn upward into the collection chamber 28, through the inlet opening 27 by virtue of the upward and rapidly flowing exhaust gases 29.

The collection housing 22 is large enough to collect all of the exhaust gases discharged from the exhaust pipe 17 which enter the housing through the inlet opening 27, providing the outlet opening 32 is large enough and the draft is great enough to draw off the excess gases.

In the preferred form of the invention, the inlet opening 27 is approximately twice the diameter of the outlet opening 32, and the diameter of the outlet opening 32 is approximately equal to the diameter of the exhaust opening 23. The differences in sizes of the inlet and outlet openings 27 and 32 retards the flow of gases through the collection chamber 28 just sufficiently to permit the gaseous products of combustion to mix with the air, within the collection chamber 28 before being discharged through the outlet opening 32.

The solid portion of the flat bottom wall 26 functions as a baffle to prevent the substantial loss of products of combustion which have been collected in the collection chamber 28, in the event of a surging flow of exhaust gases from the exhaust pipe 17 through the inlet opening 27.

The hot gaseous mixture of the products of combustion and air are drawn through the duct 33 by the operation of the compressor 36. The compressor 36 is preferably driven in synchronous relationship with the engine 12 by connecting the power take-off shaft 57 with the power input shaft 58 of the compressor 36 through the universal coupling 59. Thus, the amount of hot gaseous mixture drawn from the collection chamber 22 is synchronized with the generation of the exhaust gases being discharged from the exhaust pipe 17.

In a preferred form of the invention, the compressor 36 is timed so that it will draw about 5% more gas by volume through the compressor 36 than is discharged through the engine's output manifold to the exhaust pipe 17, at constant RPM. Thus, the slightly greater flow rate through the compressor 36 than through the exhaust pipe 17 will eliminate back pressure in the duct 33 and the collection chamber 22, which might cause undue loss of exhaust gases, as well as air, from the collection chamber 22. Moreover, the slightly greater draft through the compressor 36 than the exhaust pipe 17, will also create a slight negative pressure or vacuum for creating the desired flow of gases through the outlet opening 32 of the collection chamber 28.

On the other hand, an excessive negative pressure or vacuum within the compressor 36 is avoided, to prevent the hot gaseous mixture from flowing through the duct 33 so fast that the gases will become unduly cool.

It is extremely important that the gases entering the furrow 55 through the discharge conduit 38 be maintained at high temperatures in order to preserve many of the nutrient elements in their ionic form to facilitate their reaction with the microorganisms within the soil of the furrow 55.

The control valve 48 is positioned to draw the desired amount of hot compressed gases from the compressor 36 and also to draw the desired amount of supplemental nutrients from the tank 45.

The slurry from the tank 45 not only provides additional nutrients, which might not be supplied from the ambient atmosphere or the products of combustion, but also provides a base material for holding the hot active gases in the localized area of the furrow 55 for reaction with the microorganisms native to the soil.

What is claimed is:

1. A method of continuously fertilizing the soil, comprising the steps of:

(a) continuously collecting the hot gaseous products of combustion from the exhaust of an internal combustion engine of a motor vehicle moving over soil to be fertilized, in a collection chamber spaced from the exhaust of the internal combustion engine, (b) collecting air from the ambient atmosphere in said chamber, and mixing said air with said hot gaseous products of combustion in said chamber to form a hot gaseous mixture, (c) drawing said hot gaseous mixture from said collection chamber to a compressing station on said motor vehicle, (d) subsequently compressing said hot gaseous mixture in said compressing station to concentrate, and to supply auxiliary heat to, said hot gaseous mixture, and (e) continuously impregnating the soil over which said motor vehicle moves with said concentrated hot gaseous mixture from said compressing station.

2. The method according to claim 1 in which said step of impregnating said soil comprises introducing into the soil said concentrated hot gaseous mixture in the ionic form of at least some of the elements in said mixture.

3. The method according to claim 1 further comprising the step of adding to said hot gaseous mixture after it is compressed, but before it is introduced into the soil, a supplemental plant nutrient.

4. A mobile apparatus for introducing fertilizer into the soil, comprising:

(a) a prime mover having an internal combustion engine for driving said prime mover over soil to be fertilized, said engine having an exhaust duct having an exhaust opening directed upward, (b) a collection housing comprising a circumferential side wall, a closed top wall, a bottom baffle wall, an inlet opening extending through said bottom baffle wall, and an outlet opening in said collection housing, (c) said inlet opening being larger than said outlet opening, (d) mounting means supporting said collection housing on said prime mover, so that said inlet opening is spaced above and in the flow path of said exhaust opening a sufficient distance to permit substantially all the gaseous products of combustion discharging from said exhaust duct to enter through said inlet opening, along with substantial amounts of air from the ambient atmosphere, to form a hot gaseous mixture within said collection housing, (e) compressor means in fluid communication with said outlet opening operable to draw said hot gaseous mixture from said collection housing at a slightly negative pressure into said compressor means to compress and add auxiliary heat to said gaseous mixture, (f) a nozzle in said prime mover adapted to penetrate the soil over which said prime mover moves, and (g) conduit means for conveying said compressed hot gaseous mixture from said compressor means to said nozzle for introduction into the soil.

5. The invention according to claim 4 in which said compressor means is driven in synchronous relationship with said internal combustion engine.

6. The invention according to claim 5 in which said compressor means is driven to draw approximately 5% more gaseous mixture by volume through said compressor means than is discharged through said exhaust duct.

7. The invention according to claim 4 in which said inlet opening is approximately twice as large as said outlet opening.

8. The invention according to claim 4 in which said inlet opening is spaced vertically above said exhaust opening a distance of at least 6".

9. The invention according to claim 4 further comprising a supplementary nutrient container carried on said mobile apparatus, a supplemental conduit in fluid communication between said container and said conduit means, and means for controlling the flow of supplementary nutrients from said container into said conduit means.

* * * * *